US011418950B1

(12) United States Patent
Sreenivas Hariharan et al.

(10) Patent No.: US 11,418,950 B1
(45) Date of Patent: Aug. 16, 2022

(54) SYSTEM FOR ESTABLISHING A SECURE DATA CONNECTION WITH AN AUTONOMOUS MOBILE DEVICE

(71) Applicant: AMAZON TECHNOLOGIES, INC., Seattle, WA (US)

(72) Inventors: Sreekumar Sreenivas Hariharan, Lynnwood, WA (US); Adam Fineberg, Saratoga, CA (US); Swetha Bijoy, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 396 days.

(21) Appl. No.: 16/712,861

(22) Filed: Dec. 12, 2019

(51) Int. Cl.
| | |
|---|---|
| *H04L 29/06* | (2006.01) |
| *H04W 12/033* | (2021.01) |
| *H04L 9/30* | (2006.01) |
| *H04L 9/14* | (2006.01) |
| *H04W 12/30* | (2021.01) |
| *G06F 21/60* | (2013.01) |

(52) U.S. Cl.
CPC ............ *H04W 12/033* (2021.01); *H04L 9/14* (2013.01); *H04L 9/30* (2013.01); *H04W 12/30* (2021.01)

(58) Field of Classification Search
CPC ...... H04W 12/033; H04W 12/30; H04L 9/14; H04L 9/30
See application file for complete search history.

(56) References Cited

U.S. PATENT DOCUMENTS

| | | | | |
|---|---|---|---|---|
| 9,829,333 | B1 * | 11/2017 | Calder | G06Q 10/08 |
| 10,800,042 | B2 * | 10/2020 | Skubch | B25J 9/1661 |
| 2019/0245681 | A1 * | 8/2019 | Alwen | H04L 9/085 |
| 2022/0048186 | A1 * | 2/2022 | Sharma | G06F 11/3006 |

FOREIGN PATENT DOCUMENTS

| | | | | |
|---|---|---|---|---|
| WO | WO-2019140464 | A1 * | 7/2019 | G01J 1/4204 |
| WO | WO-2021256062 | A1 * | 12/2021 | |

OTHER PUBLICATIONS

Richa Varma; Chris Melville; Claudio Pinello; Tuhin Sahai; "Post Quantum Secure Command and Control of Mobile Agents Inserting quantum-resistant encryption schemes in the Secure Robot Operating System"; 2020 Fourth IEEE International Conference on Robotic Computing; Year: 2020; IEEE; pp. 33-40 (Year: 2020).*

* cited by examiner

*Primary Examiner* — Shewaye Gelagay
*Assistant Examiner* — Courtney D Fields
(74) *Attorney, Agent, or Firm* — Lindauer Law, PLLC

(57) ABSTRACT

An autonomous mobile device (AMD) with various sensors may move through a physical space without human intervention. The AMD may communicate with other devices, such as a user's smartphone or network enabled speaker. Security and privacy for end-to-end communication is provided that involves user interaction with the AMD itself. The sequence of data exchanges and the user interaction with the AMD helps assure the association is authorized and provide for a secure communication channel. Attempts to tamper with the association process, including a man in the middle exploit, are readily detectable and result in a failure. Once detected, actions may be taken, such as notifying the user.

20 Claims, 7 Drawing Sheets

SYSTEM FOR ESTABLISHING A SECURE DATA CONNECTION WITH AN AUTONOMOUS MOBILE DEVICE

BACKGROUND

An autonomous mobile device (AMD) having various sensors is able to perform tasks in a physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
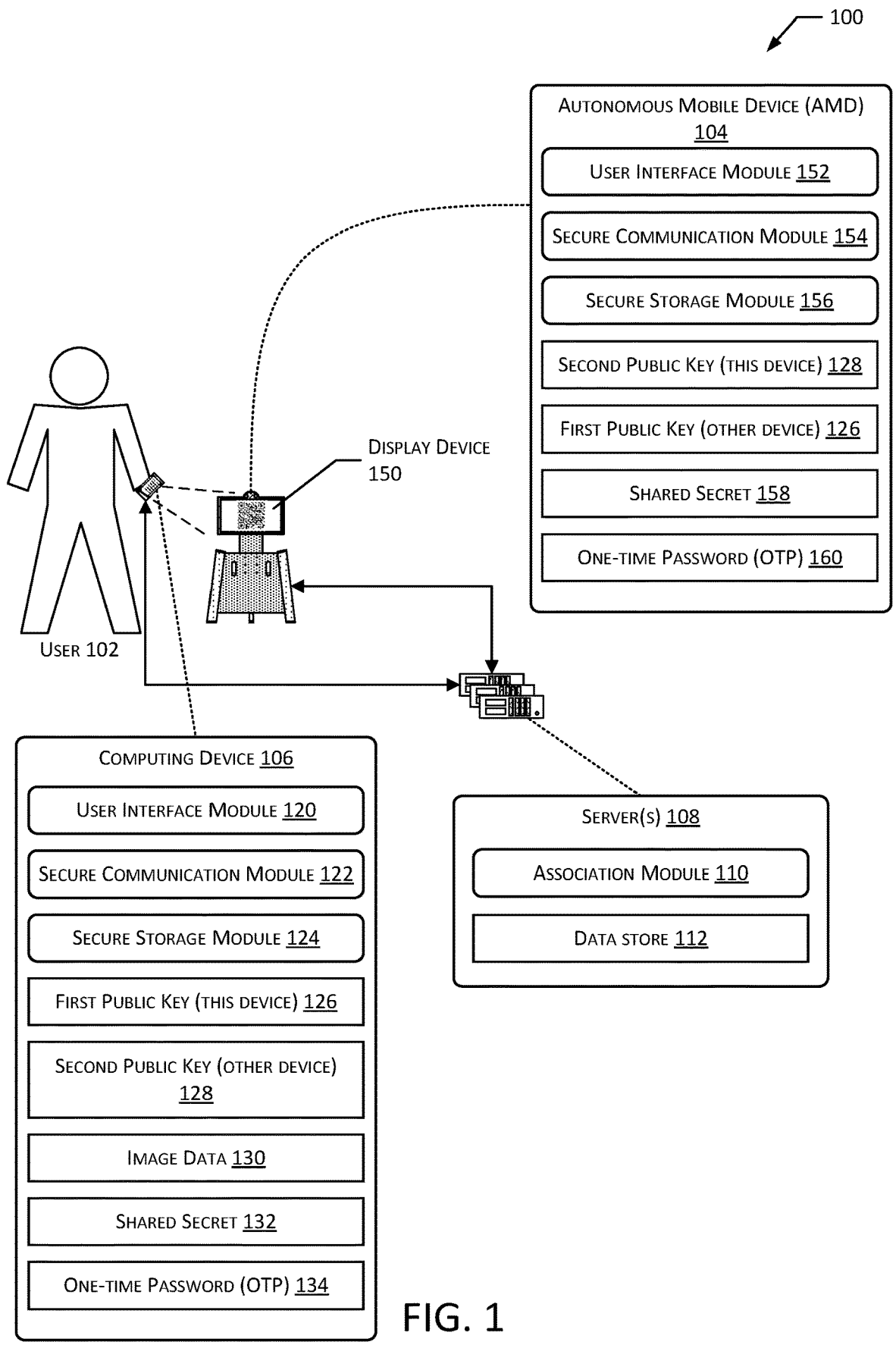
FIG. 1 illustrates a system for establishing secure communication between an autonomous mobile device (AMD) and a computing device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD), such as a robot, is capable of autonomous movement from one location in a physical space to another. The AMD may perform tasks that involve moving within the physical space. These tasks may also include patrolling the physical space, interacting with users, and so forth. For example, the AMD may perform sentry tasks involving moving through rooms in the physical space.

The AMD includes various sensors such as cameras, microphones, time-of-flight optical sensors, and so forth to provide sensor data. This sensor data is used by the AMD for to perform the tasks and various functions associated with those tasks. For example, images acquired by cameras on the AMD may be used to determine where the AMD is in the physical space, to recognize whether a person is an authorized user or an intruder, and so forth.

A user, or a service that has been authorized by the user, may issue commands to the AMD. For example, the user who is near the AMD may issue a verbal command by speaking. The user may also issue commands to the AMD using a computing device such as a smartphone, tablet computer, network enabled audio device, and so forth. The computing device may be in the same room as the AMD, or may be at another geographic location. For example, the user may use an application executing on their smartphone to tell the AMD to perform a sentry task. As part of the sentry task, images from the camera onboard the AMD may be sent to the smartphone and displayed on the screen, so the user is able to see what is happening.

Information sent between the AMD and an associated application on a computing device is encrypted to assure privacy and prevent unauthorized access. Traditionally, establishing secure connectivity between devices has involved significant effort for the parties involved. An end user traditionally had to perform multiple steps, many of which were prone to error resulting in a failed association between devices. Operators of systems also traditionally incurred significant costs associated with maintaining a cryptographic infrastructure.

Described in this disclosure are computer implemented techniques that allow an AMD and an application executing on a computing device to easily associate with one another in a highly secure fashion. As described herein, the techniques involve the user to provide assurance that a particular AMD is being associated with a particular computing device. Using the techniques described in this disclosure, the involvement of the user while attempting to associate, or pair, the AMD with an application on a first computing device is very simple. As a result, the likelihood of success for a legitimate association is significantly improved compared to conventional techniques.

The techniques described in this disclosure also permit the use of an otherwise unsecured channel to associate devices and, once associated, transfer information in a secure fashion. As a result, the association process may be performed using different network protocols and computing devices. For example, a headless device which does not include a display may be associated with the AMD using the techniques described.

In a first implementation, a user executes a first application on first computing device. For example, the user may run an app on a smartphone. A user interface provides the user with a control to associate the first application with an AMD. After operating the control, the user is prompted to take a picture of a display on the AMD. Presented on the display of the AMD is a two-dimensional barcode. The first application uses information conveyed by the barcode to perform a portion of the association process. The user interface on the first computing device, or a user interface on the AMD, or both, may provide output that indicates the association has completed successfully.

In a second implementation, instead of capturing an image of the AMD, the first application may provide as output a short code, such as a six-digit one-time password (OTP). The user may use an input device on the AMD to input the OTP. Once the correct OTP is entered, the association completes.

Once the association is complete, information may be securely transferred between the AMD and the first application. While the user was involved in the association process, the involvement is straightforward with minimal opportunity for failure due to user error. In the event an association is attempted or failed, the user interfaces on the first computing device, the AMD, or both may provide information about the attempt and failure. This may alert the user of an unauthorized attempt to associate. Other actions may be taken, such as disallowing attempts to associate for a period of time, or requiring additional user intervention to perform the association.

While the interaction of the user is minimal, the first application and the AMD are performing a process that establishes a common shared secret without transferring sensitive information. For example, the first application may generate a first public key, which is provided to the AMD. A second application executing on the AMD generates a second public key, which is different from the first public key. The first application and the second application each use an Elliptic Curve Diffie-Hellman (ECDH) algorithm with the first public key and the second public key as inputs to determine their respective first shared secret and the second shared secret. If the public keys are processed using one of the applications, the first shared secret and the second shared secret will be identical.

The shared secret may then be used as an encryption key for subsequent communications. For example, the shared secret may be used to encrypt a session key. The encrypted session key may be sent from the first application to the second application. Once decrypted by the second application, the session key may then be used for encrypting subsequent traffic between the first application and the second application. Once the session ends, the session key may be erased.

This association may be facilitated by a second computing device, such as a server. The server may aid in facilitating communication between the AMD and the computing device. For example, the server may associate a particular user account with a particular AMD. The server may be unable to decrypt the encrypted data that passes through the server. Once the AMD and the computing device are associated, these devices may directly communicate with one another, omitting the server.

The techniques described in this disclosure facilitate highly secure communications between the AMD and other computing devices. The association process involves the participation of the user, access to the AMD, and access to the first computing device. The participation of the user is simple, minimizing the likelihood for user error and subsequent failure.

Illustrative System

FIG. 1 illustrates a system 100 in which a user 102 may initiate establishment of a secure communication between an autonomous mobile device (AMD) 104 and a computing device 106, according to some implementations. The user 102 may use an AMD 104 in a physical space, such as a home, office, or other facility. The AMD 104 may have one or more sensors and may move around within the physical space. For example, the AMD 104 may move autonomously from one room to another.

The AMD 104 may include one or more sensors that generate sensor data. The sensor data may be used to determine where the AMD 104 is in the physical space, to identify the user 102, to follow commands issued by the user 102, and so forth. For example, the sensors may include one or more of microphones, time-of-flight (TOF) sensors, cameras, and so forth.

During operation the AMD 104 may determine input data. The input data may include or be based at least in part on sensor data from the sensors onboard the AMD 104. In one implementation, a speech processing module may process raw audio data obtained by the microphone on the AMD 104 and produce input data. For example, the user 102 may say "robot, come here" which may produce input data "come here". In other implementations, the input data may be provided by the user 102 using the computing device 106 that is associated with the AMD 104. For example, the user 102 may use an application executing on a computing device 106, such as a smartphone, to send a command to the AMD 104 for the AMD 104 to move to a specific room.

The AMD 104 may also provide data to a first application executing on the computing device 106. For example, the AMD 104 may send an image acquired using a camera onboard the AMD 104 to the first application. The image may then be outputted on a display of the computing device 106, allowing the user 102 to see the image.

Information sent between the AMD 104 and an application on a computing device 106 that has been previously associated with the AMD 104 is encrypted to assure privacy and prevent unauthorized access. The information that is encrypted may include, but is not limited to, commands sent to the AMD 104, sensor data or information based on the sensor data that is sent to the computing device 106, status data about operation of the AMD 104 that is sent to the computing device 106, and so forth. The processes described in this disclosure allow the AMD 104 to be associated with the computing device 106, or the application executing on the computing device 106, for secure communication.

The computing device 106 includes a user interface module 120, a secure communication module 122, and a secure storage module 124. These modules, and others described, may comprise instructions that execute on one or more hardware processors. The user interface module 120 may present a user interface using one or more output devices. For example, the user interface module 120 may present a graphical user interface using a display device. In another example, the user interface module 120 may present a voice user interface using a speaker. The user interface module 120 may also accept user input. For example, a touch screen or a microphone on the computing device 106 may accept user input.

The secure communication module 122 may comprise one or more applications that provide the ability to encrypt and decrypt data using a common set of encryption protocols and key(s). The secure communication module 122 may generate or otherwise determine a first public key 126. For example, the secure communication module 122 may determine a public key using the Elliptic Curve Diffie-Hellman (ECDH) algorithm in which a randomly generated first private key is used to determine the first public key 126.

During the association process, the secure communication module 122 accesses a second public key 128 that is received from the AMD 104 or another system operating on behalf of the AMD 104. In one implementation, the second public key 128 may be received from the AMD 104 as an out-of-band transmission. For example, the AMD 104 may include a display device. A machine-readable code, such as a two-dimensional barcode, that encodes the second public key 128 may be outputted by presenting it on the display device. A camera associated with the computing device 106 may be used to acquire a picture of the display device, that is stored as image data 130. The image data 130 may be processed to decode the two-dimensional barcode and provide the second public key 128. By using the camera of the computing device 106 to acquire the image data 130 of the AMD 104, as manipulated by a someone such as the user 102, there is an assurance that the AMD 104 and the computing device 106 are physically near one another, at least during this portion of the association process.

During the association process, each of the devices generates a shared secret using the first public key 126 and the second public key 128. For example, the computing device 106 determines a shared secret 132 based on the first public key 126 and the second public key 128 that has been received. Using algorithms such as ECDH, the shared secret 132 produced by the secure communication module 122 of the computing device 106 will be identical to the shared secret 158 of the AMD 104. However, in the event of tampering or an attempt by a third party to try and gain authorized access, the shared secret 132 would differ from the shared secret 158, and the authorization process would fail.

In another implementation, a one-time password (OTP) 134 may be used. The secure communication module 122 executing on the computing device 106 may use the second public key 128 that was received from the AMD 104 via an existing connection, which does not have to be secure. As part of the association process, the secure communication module 122 generates a one-time password (OTP) 134 based on the shared secret 132. For example, the OTP 134 may comprise a 6-digit string using a hashed message authentication code (HMAC) algorithm. The AMD 104 also generates a OTP 160 using the shared secret 158 that it has determined.

Someone, such as the user 102, may then enter the 6-digit OTP 134 on the AMD 104. The AMD 104 may then compare the OTP 134 received from the user input with the locally determined OTP 160. A successful match of OTP 134 and OTP 160 by the AMD 104 results in the AMD 104 proceeding with the association process. If the OTP 134 and OTP 160 do not match, the association may fail. By using the input of the OTP 134 to the AMD 104, there is an assurance that the AMD 104 and the associated computing device 106 are being operated in coordination with one another, at least during this portion of the association process.

In a third implementation, a combination of the use of image data 130 and the OTP 134 may be combined. For example, a successful transfer of data encrypted with the second public key 128 as decoded from the image data 130 may be required in addition to a matching the OTP 134 value.

Once the association process is complete, the AMD 104 and the computing device 106 have an identical shared secret. This identical shared secret may be used as a cryptographic key to encrypt further communications. In one implementation, when communication is requested between the AMD 104 and the computing device 106, a session key is generated, encrypted using the shared secret, and sent to the other device. The shared secret of the receiving device is used to decrypt the session key. The session key is then used to encrypt subsequent communications.

Sensitive information, such as the shared secret 132, may be stored using the secure storage module 124. For example, the secure storage module 124 may comprise the Android keystore system in the Android operating system promulgated by Google, LLC or the keychain services in the iOS operating system promulgated by Apple, Inc. In some implementations, the secure storage module 124 may include or access a hardware security module, secure zone, cryptoprocessor, and so forth.

The AMD 104 includes a user interface module 152, a secure communication module 154, and a secure storage module 156. These modules, and others described, may comprise instructions that execute on one or more hardware processors. The user interface module 152 may present a user interface using one or more output devices. For example, the user interface module 152 may present a graphical user interface using a display device on the AMD 104. In another example, the user interface module 152 may present a voice user interface using a speaker. The user interface module 152 may also accept user input. For example, a touch screen or a microphone on the AMD 104 may accept user input.

The secure communication module 154 may comprise one or more applications that provide the ability to encrypt and decrypt data using a common set of encryption protocols and key(s). The secure communication module 154 may generate or otherwise determine the second public key 128. For example, as with the secure communication module 122, the secure communication module 154 may determine a public key using the Elliptic Curve Diffie-Hellman (ECDH) algorithm in which a randomly generated second private key is used to determine the second public key 128.

During the association process, the secure communication module 154 accesses the first public key 126 that is received from the computing device 106 or another system operating on behalf of the computing device 106. In one implementation, the first public key 126 may be sent using an available network. In another implementation, the first public key 126 may be received from the computing device 106 as an out-of-band transmission. For example, the computing device 106 may include a display device. A machine-readable code, such as a two-dimensional barcode, that encodes the first public key 126 may be presented on the display device. A camera associated with the AMD 104 may be used to acquire a picture of the display device, that is stored as image data (not shown). The image data may be processed to decode the two-dimensional barcode and provide the first public key 126. By using the camera of the AMD 104 to acquire the image data of the computing device 106, as manipulated by a someone such as the user 102, there is an assurance that the AMD 104 and the computing device 106 are physically near one another, at least during this portion of the association process.

As mentioned above, the secure communication module 154 may determine the shared secret 158 based on the second public key 128 and the first public key 126. The shared secret 158 may then be used to determine the OTP 160. As part of the association process, the OTP 160 may be compared to the OTP 134 that was received via an input device on the AMD 104. If the OTP 160 and the OTP 134 match, the association may proceed. In some implementations, the secure communication module 154 may permit a re-entry in the event of a mismatch. For example, the user 102 may be permitted three possible attempts within a threshold amount of time to enter a matching OTP 134. If the re-tries fail to result in a match, the association may fail.

A second computing device, such as one or more servers 108 may facilitate the association process. The servers 108 may include an association module 110 and a data store 112. These modules, and others described, may comprise instructions that execute on one or more hardware processors. The association module 110 may provide an application programming interface (API) that allows a computing device 106 to request an association with a specified AMD 104. The data store 112 may store information that associates identification data indicative of a particular AMD 104 with information such as a current communication address. For example, the AMD 104 may communicate with the server 108, providing a network address at which the AMD 104 may be reached. The association module 110 may provide various functions, such as verifying that a request for association is valid, confirming authentication credentials of the requestor, and so forth. The server 108 may operate as an intermediary that facilitates transfer of data between the AMD 104 and the computing device 106 until an association is successfully completed. Once successfully completed, the encrypted communications between the AMD 104 and the now-associated computing device 106 may omit the server 108.

In some implementations, the AMD 104 and computing device 106 may perform the association without the server 108. For example, if a network connection to the server 108 is unavailable and the AMD 104 and the computing device 106 are on the same local area network, the association may be performed without the server 108.

Output may be provided to the user 102 about the outcome of an attempted association. For example, output indicative of a successful association or a failed attempt may be presented by one or more of the AMD 104, the computing device 106, and so forth. This output may be provided based on output from one or more of the secure communication module 122 of the computing device 106, the secure communication module 154 of the AMD 104, the association module 110 of the server 108, or another system.

Some implementations of the processes used by the secure communication module 122 are described with regard to FIGS. 4-7.

Figure 2:
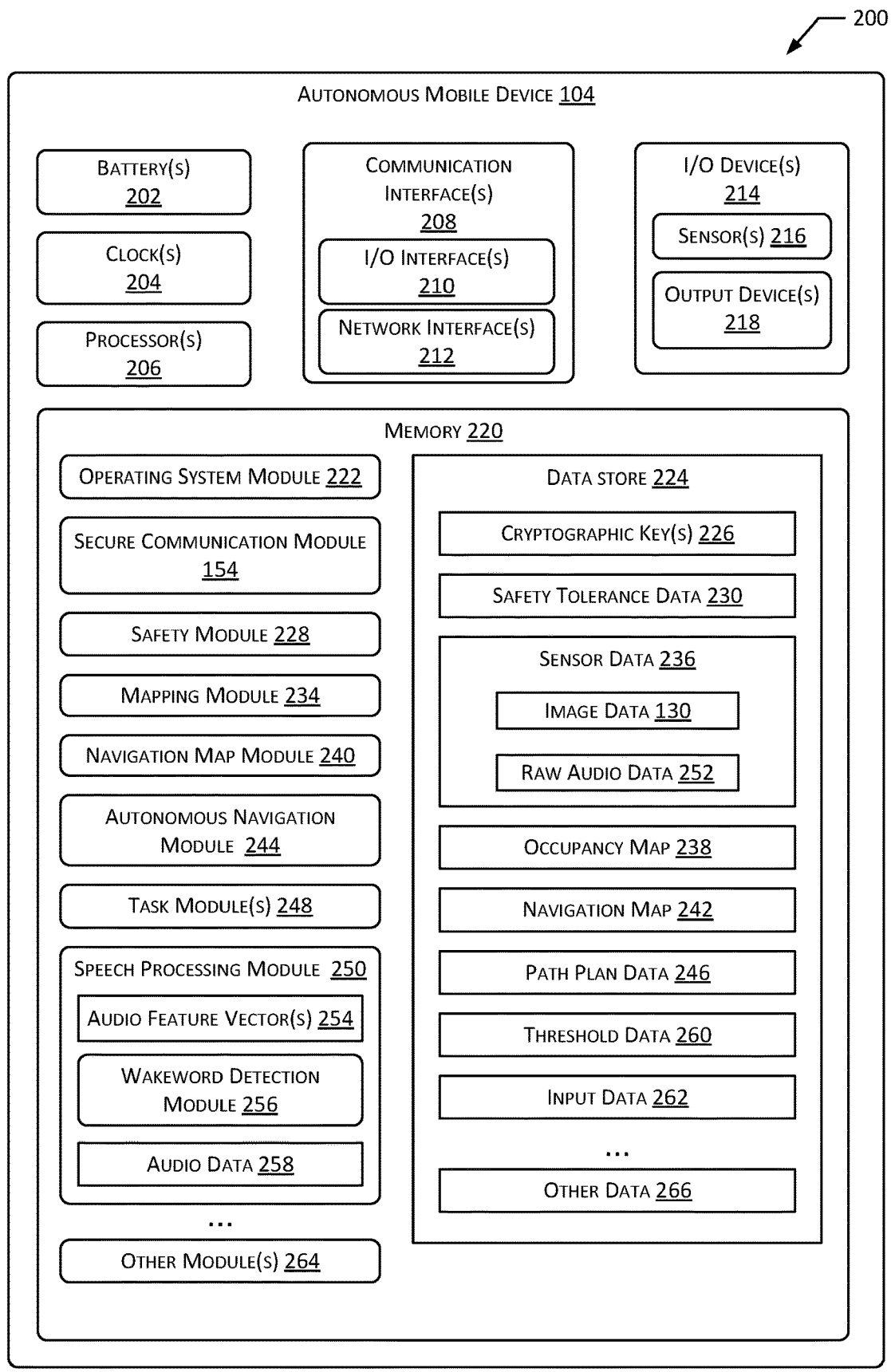
FIG. 2 is a block diagram of the components of the AMD, according to some implementations.

FIG. 2 is a block diagram 200 of the components of the AMD 104, according to some implementations. The AMD 104 may include one or more batteries 202 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 204 may provide information indicative of date, time, ticks, and so forth. For example, the processor 206 may use data from the clock 204 to associate a particular time with an action, sensor data 236, and so forth.

The AMD 104 may include one or more hardware processors 206 (processors) configured to execute one or more stored instructions. The processors 206 may comprise one or more cores. The processors 206 may include microcontrollers, systems on a chip, field programmable gate arrays, digital signal processors, graphic processing units, general processing units, and so forth.

The AMD 104 may include one or more communication interfaces 208 such as input/output (I/O) interfaces 210, network interfaces 212, and so forth. The communication interfaces 208 enable the AMD 104, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include input devices such as one or more of a sensor 216, keyboard, pointing device, scanner, and so forth. The I/O devices 214 may also include output devices 218 such as one or more of a motor, light, speaker, display, projector, printer, and so forth. In some embodiments, the I/O devices 214 may be physically incorporated with the AMD 104 or may be externally placed.

The network interfaces 212 may be configured to provide communications between the AMD 104 and other devices such as other AMDs 104, docking stations, routers, access points, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the AMD 104. A few example functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the I/O interfaces 210, the I/O devices 214, the communication interfaces 208, and provide various services to applications or modules executing on the processors 206. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 220 may be a data store 224 and one or more of the following modules. These modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including other AMDs 104, servers, network attached storage devices, and so forth.

The secure communication module 154 may be configured to establish secure communication with other devices, such as other AMDs 104, an external server, a docking station, and so forth. The communications may be encrypted, and so forth as described herein. During operation, one or more cryptographic keys 226 may be stored in the data store 224. For example, the shared secret 158 may be stored using the secure storage module 156.

Other modules within the memory 220 may include a safety module 228, a mapping module 234, a navigation map module 240, an autonomous navigation module 244, one or more task modules 248, a speech processing module 250, or other modules 264. The modules may access data stored within the data store 224, including safety tolerance data 230, sensor data 236, an occupancy map 238, a navigation map 242, path plan data 246, threshold data 260, input data 262, other data 266, and so forth.

The safety module 228 may access the safety tolerance data 230 to determine within what tolerances the AMD 104 may operate safely within the physical space. For example, the safety module 228 may be configured to stop the AMD 104 from moving when an extensible mast of the AMD 104 is extended. In another example, the safety module 228 may access safety tolerance data 230 that specifies a minimum distance from an object that the AMD 104 is to maintain. Continuing this example, when a sensor 216 detects an object has approached to less than the minimum distance, all movement of the AMD 104 may be stopped. Movement of the AMD 104 may be stopped by one or more of inhibiting operations of one or more of the motors, issuing a command to stop motor operation, disconnecting power from one or more the motors, and so forth. The safety module 228 may be implemented as hardware, software, or a combination thereof.

The safety module 228 may control other factors, such as a maximum velocity of the AMD 104 based on information obtained by the sensors 216, precision and accuracy of the sensor data 236, and so forth. For example, detection of an object by an optical sensor may include some error, such as when the distance to an object comprises a weighted average between an object and a background. As a result, the maximum velocity permitted by the safety module 228 may be based on one or more factors such as the weight of the AMD 104, nature of the floor, distance to the object, and so forth. In the event that the maximum permissible velocity differs from the maximum velocity permitted by the safety module 228, the lesser velocity may be utilized.

The mapping module 234 may use one or more of sensor data 236, input data 262, and so forth to determine the occupancy map 238 that is representative of the physical features in the physical space. For example, during a learning phase the user may take the AMD 104 on a tour of the physical space, allowing the AMD 104 to explore and generate the occupancy map 238 and associated data, including receiving input data 262 that designates a particular obstacle type, door, gate, moveable furniture, and so forth. In another example, during subsequent operation, the AMD 104 may generate the occupancy map 238 as it moves unattended through the physical space.

The navigation map module 240 may use the occupancy map 239 as input to generate the navigation map 242. One or more inflation parameters may be used during operation of the navigation map module 240. The inflation parameters provide information such as inflation distance, inflation adjustment values, and so forth. In some implementations the inflation parameters may be based at least in part on the sensor field of view (FOV), physical dimensions of the AMD 104, localization accuracy, and so forth. For example, the navigation map module 240 may inflate the apparent area of an obstacle by an inflation distance that is greater than one half the width of the AMD 104.

The autonomous navigation module 244 provides the AMD 104 with the ability to navigate within the physical space without real-time human interaction. The autonomous navigation module 244 may implement, or operate in conjunction with, the mapping module 234 to determine the occupancy map 238, the navigation map 242, or other representation of the physical space. In one implementation, the mapping module 234 may use one or more simultaneous localization and mapping ("SLAM") techniques. The SLAM algorithms may utilize one or more of maps, algorithms, beacons, or other techniques to navigate. The autonomous navigation module 244 may use the navigation map 242 to determine a set of possible paths along which the AMD 104 may move. One of these may be selected and used to determine path plan data 246 indicative of a path. For example, a possible path that is the shortest, or has the fewest turns, and so forth may be selected and used to determine the path. In one implementation, the Theta* path planning algorithm may be used to determine a path cost for each path, and the path cost may be used to select a particular path. (See "Theta*: Any-Angle Path Planning on Grids", Alex Nash, Kenny Daniel, Sven Koenig, Ariel Felner.)

The path is then subsequently used to determine a set of commands that drive the motors connected to the wheels. For example, the autonomous navigation module 244 may determine the first location within the physical space and determine path plan data 246 that describes the path to a second location.

The autonomous navigation module 244 may utilize various techniques during processing of sensor data 236. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 206, in response to a command received from one or more communication interfaces 208, as determined from the sensor data 236, and so forth. For example, an external server 108 may send a command that is received using the network interface 212. This command may direct the AMD 104 to proceed to find a particular user, follow a particular user, and so forth. The AMD 104 may then process this command and use the autonomous navigation module 244 to determine the directions and distances associated with carrying out the command. For example, the command to "come here" may result in a task module 248 sending a command to the autonomous navigation module 244 to move the AMD 104 to a particular location near the user and orient the AMD 104 in a particular direction.

The speech processing module 250 may be used to process utterances of the user. Microphones may acquire audio in the presence of the AMD 104 and may send raw audio data 252 to an acoustic front end (AFE). The AFE may transform the raw audio data 252 (for example, a single-channel, 16-bit audio stream sampled at 16 kHz), captured by the microphone, into audio feature vectors 254 that may ultimately be used for processing by various components, such as a wakeword detection module 256, speech recognition engine, or other components. The AFE may reduce noise in the raw audio data 252. The AFE may also perform acoustic echo cancellation (AEC) or other operations to account for output audio data that may be sent to a speaker of the AMD 104 for output. For example, the AMD 104 may be playing music or other audio that is being received from a network in the form of output audio data. To avoid the output audio interfering with the device's ability to detect and process input audio, the AFE or other component may perform echo cancellation to remove the output audio data from the input raw audio data 252, or other operations.

The AFE may divide the raw audio data 252 into frames representing time intervals for which the AFE determines a number of values (i.e., features) representing qualities of the raw audio data 252, along with a set of those values (i.e., a feature vector or audio feature vector 254) representing features/qualities of the raw audio data 252 within each frame. A frame may be a certain period of time, for example a sliding window of 25 ms of audio data 258 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 252, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 254 (or the raw audio data 252) may be input into a wakeword detection module 256 that is configured to detect keywords spoken in the audio. The wakeword detection module 256 may use various techniques to determine whether audio data 258 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 256 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 256 may compare audio data 258 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 258 (which may include one or more of the raw audio data 252 or the audio feature vectors 254) to one or more server(s) 108 for speech processing. The audio data 258 corresponding to audio obtained by the microphone may be processed locally on one or more of the processors 206, sent to a server for routing to a recipient device or may be sent to the server for speech processing for interpretation of the included speech (either for purposes of enabling voice-communications and/or for purposes of executing a command in the speech). The audio data 258 may include data corresponding to the wakeword, or the portion of the audio data 258 corresponding to the wakeword may be removed by the AMD 104 before processing by the navigation map module 240, prior to sending to the server, and so forth.

The speech processing module 250 may include or access an automated speech recognition (ASR) module. The ASR module may accept as input raw audio data 252, audio feature vectors 254, or other sensor data 236 and so forth and may produce as output the input data 262 comprising a text string or other data representation. The input data 262 comprising the text string or other data representation may be processed by the navigation map module 240 to determine the command to be executed. For example, the utterance of the command "robot, come here" may result in input data 262 comprising the text string "come here". The wakeword "robot" may be omitted from the input data 262.

The AMD 104 may connect to the network using one or more of the network interfaces 212. In some implementations, one or more of the modules or other functions described here may execute on the processors 206 of the AMD 104, on the server, or a combination thereof. For example, one or more servers may provide various functions, such as ASR, natural language understanding (NLU), providing content such as audio or video to the AMD 104, and so forth.

The other modules 264 may provide other functionality, such as object recognition, speech synthesis, user identification, and so forth. The other modules 264 may comprise a speech synthesis module that is able to convert text data to human speech. For example, the speech synthesis module may be used by the AMD 104 to provide speech that a user is able to understand.

The data store 224 may store the other data 266 as well. For example, localization settings may indicate local preferences such as language, user identifier data may be stored that allows for identification of a particular user, and so forth.

Figure 3:
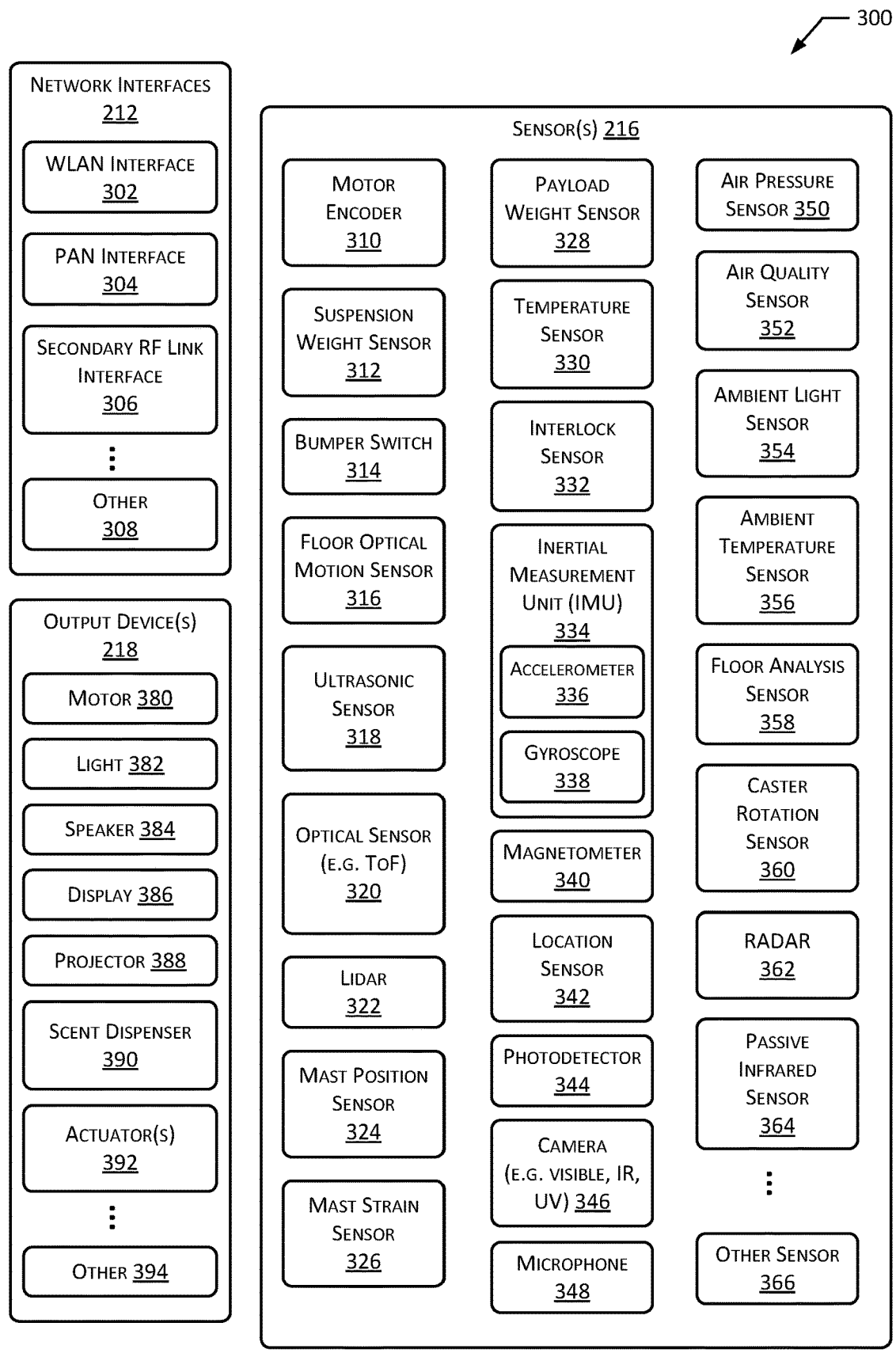
FIG. 3 is a block diagram of some components of the AMD, such as network interfaces, sensors, and output devices, according to some implementations.

FIG. 3 is a block diagram 300 of some components of the AMD 104 such as network interfaces 212, sensors 216, and output devices 218, according to some implementations. The components illustrated here are provided by way of illustration and not necessarily as a limitation. For example, the AMD 104 may utilize a subset of the particular network interfaces 212, output devices 218, or sensors 216 depicted here, or may utilize components not pictured. One or more of the sensors 216, output devices 218, or a combination thereof may be included on a moveable component that may be panned, tilted, rotated, or any combination thereof with respect to a chassis of the AMD 104.

The network interfaces 212 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices in the event that communication fails using one or more of the WLAN interface 302 or the PAN interface 304. For example, in the event the AMD 104 travels to an area within the physical space that does not have Wi-Fi coverage, the AMD 104 may use the secondary RF link interface 306 to communicate with another device such as a specialized access point, docking station, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 216. The sensors 216 depicted here are provided by way of illustration and not necessarily as a limitation. It is understood that other sensors 216 may be included or utilized by the AMD 104, while some sensors 216 may be omitted in some configurations.

A motor encoder 310 provides information indicative of the rotation or linear extension of a motor 380. The motor 380 may comprise a rotary motor, or a linear actuator. In some implementations, the motor encoder 310 may comprise a separate assembly such as a photodiode and encoder wheel that is affixed to the motor 380. In other implementations, the motor encoder 310 may comprise circuitry configured to drive the motor 380. For example, the autonomous navigation module 244 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 228 may use data from the suspension weight sensor 312 to determine whether or not to inhibit operation of one or more of the motors 380. For example, if the suspension weight sensor 312 indicates no weight on the suspension, the implication is that the AMD 104 is no longer resting on its wheels, and thus operation of the motors 380 may be inhibited. In another example, if the suspension weight sensor 312 indicates weight that exceeds a threshold value, the implication is that something heavy is resting on the AMD 104 and thus operation of the motors 380 may be inhibited.

One or more bumper switches 314 provide an indication of physical contact between a bumper or other member that is in mechanical contact with the bumper switch 314. The safety module 228 utilizes sensor data 236 obtained by the bumper switches 314 to modify the operation of the AMD 104. For example, if the bumper switch 314 associated with a front of the AMD 104 is triggered, the safety module 228 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 216 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 236 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 216 such as an image sensor or camera 346. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 236 may be generated that is indicative of the presence of objects and the relative positions, shapes, and so forth that are visible to the lidar 322. Data from the lidar 322 may be used by various modules. For example, the autonomous navigation module 244 may utilize point cloud data generated by the lidar 322 for localization of the AMD 104 within the physical space.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 228. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 228 may utilize sensor data 236 obtained by the mast strain sensor 326. For example, if the strain applied to the mast exceeds a threshold amount, the safety module 228 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 228 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 202, one or more motors 380, and so forth. In the event the temperature exceeds a threshold value, the component associated with that device temperature sensor 330 may be shut down.

One or more interlock sensors 332 may provide data to the safety module 228 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

The sensors 216 may include an inertial measurement unit (IMU) 334. The IMU 334 may include one or more of an accelerometer 336 or a gyroscope 338 (or gyrometer). The accelerometer 336 provides information indicative of a direction and magnitude of an imposed acceleration. Data such as rate of change, determination of changes in direction, velocity, and so forth may be determined using the accelerometer 336. The accelerometer 336 may comprise mechanical, optical, micro-electromechanical, or other devices. For example, the accelerometer 336 may comprise a prepackaged solid-state device that provides multiple axis accelerometers 336.

The gyroscope 338 (or gyrometer) may provide information indicative of rotation of an object affixed thereto. For example, the gyroscope 338 may generate sensor data 236 that is indicative of a change in angular orientation of the AMD 104 or a portion thereof with respect to an axis. The gyroscope 338 may comprise mechanical, optical, micro-electromechanical, or other devices. For example, the gyroscope 338 may comprise a prepackaged solid-state device that provides multiple axis gyroscopes 336.

A magnetometer 340 may be used to determine an orientation by measuring ambient magnetic fields, such as the terrestrial magnetic field. For example, the magnetometer 340 may comprise a Hall effect transistor that provides output compass data indicative of a magnetic heading.

The AMD 104 may include one or more location sensors 342. The location sensors 342 may comprise an optical, radio, or other navigational system such as a global positioning system (GPS) receiver. For indoor operation, the location sensors 342 may comprise indoor position systems, such as using Wi-Fi Positioning Systems (WPS). The location sensors 342 may provide information indicative of a relative location, such as "living room" or an absolute location such as particular coordinates indicative of latitude and longitude, or displacement with respect to a predefined origin.

A photodetector 344 provides sensor data 236 indicative of impinging light. For example, the photodetector 344 may provide data indicative of a color, intensity, duration, and so forth.

A camera 346 generates sensor data 236 indicative of one or more images. The camera 346 may be configured to detect light in one or more wavelengths including, but not limited to, terahertz, infrared, visible, ultraviolet, and so forth. For example, an infrared camera 346 may be sensitive to wavelengths between approximately 700 nanometers and 1 millimeter. The camera 346 may comprise charge coupled devices (CCD), complementary metal oxide semiconductor (CMOS) devices, microbolometers, and so forth. The AMD 104 may use image data acquired by the camera 346 for object recognition, navigation, collision avoidance, user communication, and so forth. For example, a pair of cameras 346 sensitive to infrared light may be mounted on the front of the AMD 104 to provide binocular stereo vision, with the sensor data 236 comprising images being sent to the autonomous navigation module 244. In another example, the camera 346 may comprise a 10 megapixel or greater camera that is used for videoconferencing or for acquiring pictures for the user.

The camera 346 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 346, particularly those associated with navigation or autonomous operation, may utilize a global shutter. In other implementations, the camera(s) 346 providing images for use by the autonomous navigation module 244 may be acquired using a rolling shutter and subsequently may be processed to mitigate image artifacts.

One or more microphones 348 may be configured to acquire information indicative of sound present in the physical space. In some implementations, arrays of microphones 348 may be used. These arrays may implement beamforming techniques to provide for directionality of gain. The AMD 104 may use the one or more microphones 348 to acquire information from acoustic tags, accept voice input from users 102, determine a direction of an utterance, determine ambient noise levels, for voice communication with another user or system, and so forth.

An air pressure sensor 350 may provide information indicative of an ambient atmospheric pressure or changes in ambient atmospheric pressure. For example, the air pressure sensor 350 may provide information indicative of changes in air pressure due to opening and closing of doors, weather events, and so forth.

An air quality sensor 352 may provide information indicative of one or more attributes of the ambient atmosphere. For example, the air quality sensor 352 may include one or more chemical sensing elements to detect the presence of carbon monoxide, carbon dioxide, ozone, and so forth. In another example, the air quality sensor 352 may comprise one or more elements to detect particulate matter in the air, such as the photoelectric detector, ionization chamber, and so forth. In another example, the air quality sensor 352 may include a hygrometer that provides information indicative of relative humidity.

An ambient light sensor 354 may comprise one or more photodetectors or other light-sensitive elements that are used to determine one or more of the color, intensity, or duration of ambient lighting around the AMD 104.

An ambient temperature sensor 356 provides information indicative of the temperature of the ambient physical space proximate to the AMD 104. In some implementations, an infrared temperature sensor may be utilized to determine the temperature of another object at a distance.

A floor analysis sensor 358 may include one or more components that are used to generate at least a portion of the floor characterization data. In one implementation, the floor analysis sensor 358 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 358 may be used by one or more of the safety module 228, the autonomous navigation module 244, the task module 248, and so forth. For example, if the floor analysis sensor 358 determines that the floor is wet, the safety module 228 may decrease the velocity of the AMD 104 and generate a notification alerting the user.

The floor analysis sensor 358 may include other components as well. For example, a coefficient of friction sensor may comprise a probe that comes into contact with the surface and determines the coefficient of friction between the probe and the floor.

A caster rotation sensor 360 provides data indicative of one or more of a direction of orientation, angular velocity, linear velocity of the caster, and so forth. For example, the caster rotation sensor 360 may comprise an optical encoder and corresponding target that is able to determine that the caster transitioned from an angle of 0° at a first time to 49° at a second time. Data from the caster rotation sensor 360 may be used to determine at least a portion of the motion data.

The sensors 216 may include a radar 362. The radar 362 may be used to provide information as to a distance, lateral position, and so forth, to an object.

The sensors 216 may include a passive infrared (PIR) sensor 364. The PIR 364 sensor may be used to detect the presence of users 102, pets, hotspots, and so forth. For example, the PIR sensor 364 may be configured to detect infrared radiation with wavelengths between 8 and 14 micrometers.

The AMD 104 may include other sensors 366 as well. For example, a capacitive proximity sensor may be used to provide proximity data to adjacent objects. Other sensors 366 may include radio frequency identification (RFID) readers, near field communication (NFC) systems, coded aperture cameras, and so forth. For example, NFC tags may be placed at various points within the physical space to provide landmarks for the autonomous navigation module 244. One or more touch sensors may be utilized to determine contact with a user or other objects.

The AMD 104 may include one or more output devices 218. A motor 380 may be used to provide linear or rotary motion. A light 382 may be used to emit photons. A transducer such as a speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 380 with an eccentric weight may be used to create a buzz or vibration to allow the AMD 104 to simulate the purr of a cat.

Figure 4:
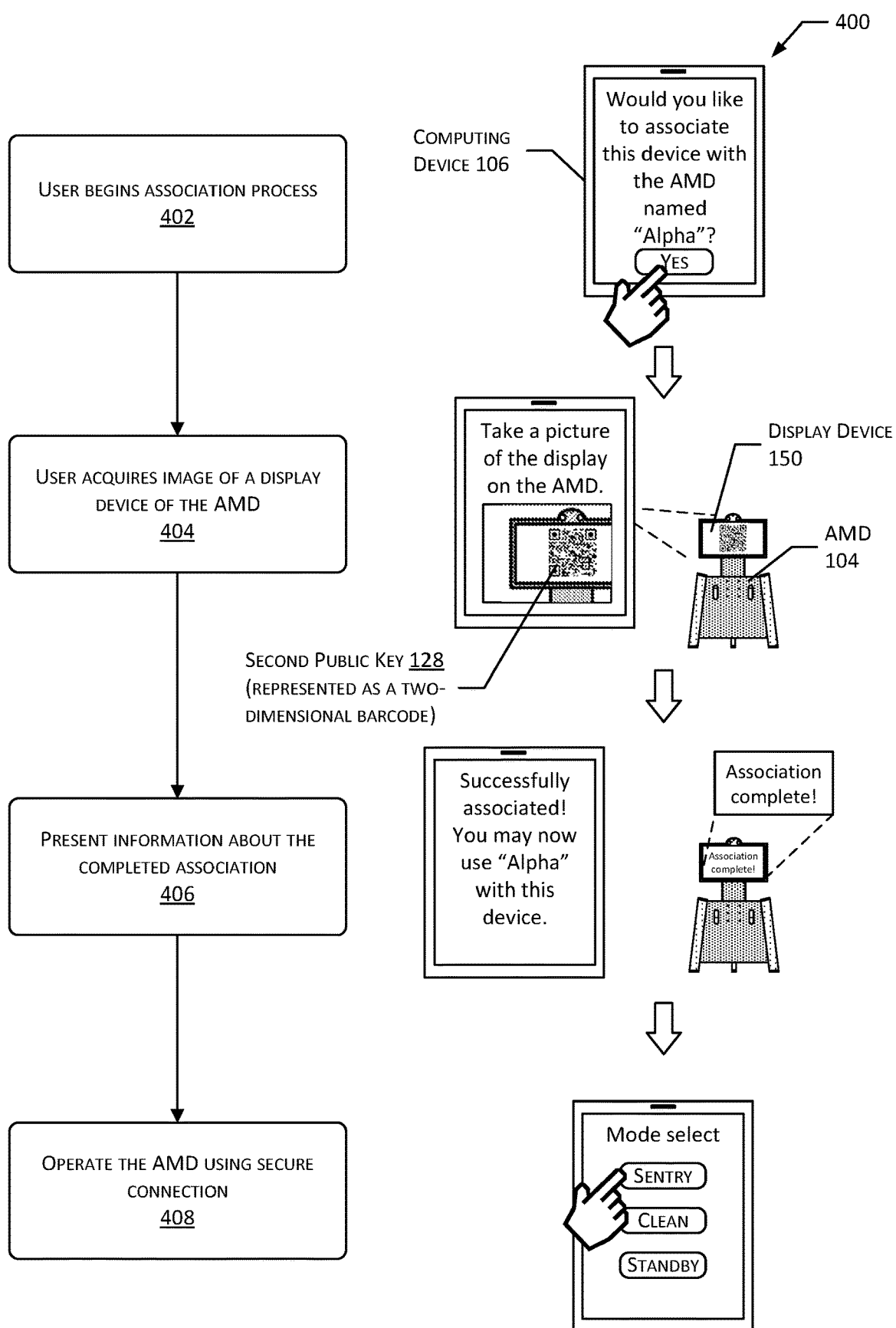
FIG. 4 illustrates a scenario in which a user is able to easily associate the AMD with the computing device to provide secure communication between the two devices, according to some implementations.

FIG. 4 illustrates a scenario 400 in which a user 102 is able to easily associate the AMD 104 with the computing device 106 to provide secure communication between the two devices, according to some implementations.

At 402, to begin an association between the computing device 106 and the AMD 104, the user 102 operates a control presented in a graphical user interface presented by the computing device 106. For example, the user 102 may provide a touch input to a control presented on a display device with a touch sensor. In another implementation the user 102 may use a spoken command and a voice user interface to begin the association.

At 404, the user 102 uses the camera on the computing device 106 to acquire an image of the display device of the AMD 104 that is outputting a two-dimensional barcode that encodes the second public key 128.

At 406, information about the completed association is presented. For example, the computing device 106 may present on its display device text or icons indicative of the successful association. In another example, the AMD 104 may present on its display 386 text or icons indicative of the successful association.

At 408, the AMD 104 may be operated using a secure connection that has been facilitated by the association. For example, information such as commands to operate the AMD 104 in a particular mode or to perform a particular task may be securely sent from the computing device 106 to the AMD 104.

As shown in this illustration, the user 102 participates in the association process, which acts to confirm the intent of the user 102 to associate the devices. The participation by the user 102, while needed, is minimal, increasing the likelihood of a successful association when intended and reducing the likelihood of a failure due to user 102 error. As a result, the user experience in performing the association is improved.

Figure 5:
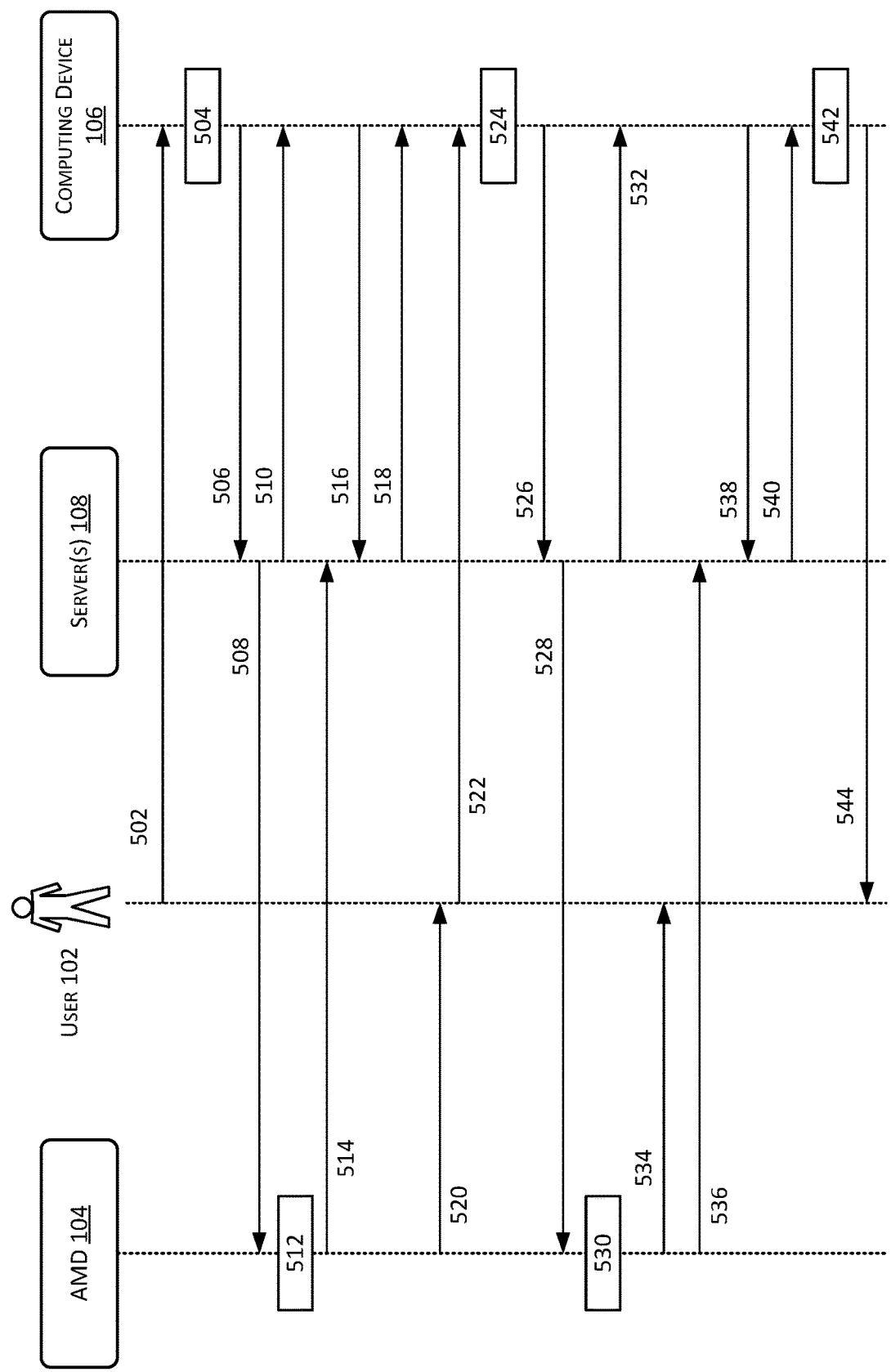
FIG. 5 illustrates a flow diagram of a process to, using a public key presented by the AMD, associate the AMD with an application executing on a computing device to allow secure communication, according to some implementations.

FIG. 5 illustrates a flow diagram 500 of a process to, using a public key presented by the AMD 104, associate the AMD 104 with an application executing on a computing device 106 to allow secure communication, according to some implementations.

In this illustration, the user 102, the AMD 104, the first computing device 106, and a second computing device such as the server 108 are shown. In this illustration time increases down the page. For example, an operation at the top of the diagram occurs before an operation at the bottom of the diagram. In some implementations, the order in which operations are performed may vary from that depicted. Operations performed by a device may be performed by one or more modules. These modules may include applications executing on one or more hardware processors of the respective device.

At 502, a user 102 provides input to the computing device 106 that initiates the process to associate the computing device 106, or an application executing thereon, with the AMD 104. For example, the user 102 may execute a first application on the computing device 106. The first application may authenticate the user 102 to a first user account. For example, the first application may accept a fingerprint or username and password to identify the user 102 and associated first user account. The first application may then present a user interface indicating that the AMD 104, also associated with the first user account, is available to be associated with.

At 504, the computing device 106 generates a first public key 126. For example, the secure communication module 122 may use an Elliptic Curve Diffie-Hellman (ECDH) algorithm to generate the first public key 126 responsive to the initiating of the association process.

At 506, the first computing device 106 sends, to a second computing device, a first message requesting establishment of secure communication between the computing device 106, or the application executing thereon, and a first AMD 104. For example, the secure communication module 122 may send a first message to the server 108. The first message may comprise the first public key 126, first data and second data. The first data may comprise first identification data corresponding to the first application, and second identification data indicative of the first application. The first identification data may comprise a first value that corresponds to or is representative of the first application that is based at least in part on user input, and is unique with respect to a set of applications associated with a first user account. For example, the first value may comprise the string "Pat's Phone" as entered by the user 102. The second identification data may comprise a second value representative of the first application that is determined during installation or licensing of the first application and is unique with respect to at least the set of applications associated with the first user account. For example, the value may comprise an application identifier string generated during installation of the secure communication module 122 on the computing device 106.

The second data may comprise third identification data corresponding to or indicative of the AMD 104. The third identification data, or device identification data, may comprise a third value based at least in part on a device identifier that is unique with respect to at least a set of AMDs 104. For example, the third value may comprise a device serial number (DSN) that is provided to the AMD 104 during manufacture or setup.

The first message may include data indicative of a mode to be used for the association process. For example, the data may indicate that a first mode that transfers the second public key 128 using a camera, or a second mode that uses a one-time password.

The first message is received by the server 108, and at 508 the server 108 sends a second message to the AMD 104. The association module 110 executing on the server 108 may determine, based on the second data and previously stored information in the data store 112, a communication address associated with the AMD 104. For example, the association module 110 may query the data store 112 using the DSN to find a last known internet protocol address for that particular AMD 104. The second message may comprise the first public key 126 and at least a portion of the first data. For example, the portion of the second message may include the first identification data and the second identification data.

At 510, the server 108 sends a message to the computing device 106 that includes a request identifier. The message is indicative that the association process has begun.

At 512 the AMD 104 generates the second public key 128. For example, the secure communication module 154 may use the ECDH algorithm to generate the second public key 128. In some implementations, the generation of the second public key 128 may be responsive to receiving the second message.

The AMD 104 may then proceed to determine the first shared secret 158. For example, the secure communication module 154 may use the ECDH algorithm to determine the first shared secret 158 using the first public key 126 and the second public key 128.

In some implementations, the generation of the second public key 128 and the subsequent operations may be conditional upon the AMD 104 being in a state deemed suitable for the association to take place. For example, the AMD 104 may be unavailable for the association process if it is currently presenting a real-time videoconference call or is delivering something to a user 102. Responsive to receiving the second message, the secure communication module 154 may determine a first state of the AMD 104 that is indicative of operation of the AMD 104 at a first time. For example, the secure communication module 154 may request device status data from another module executing on the AMD 104. The first state may be compared to previously stored data that indicates which state values allow the association process and which do not. For example, a first state such as "AMD idle" may allow association to take place while a second state such as "AMD performing task" may not allow association to take place. Once a determination is made that the first state is associated with the secure communication module 154 being permitted to proceed with the association process, the second public key 128 may be generated and the process may proceed.

At 514, the AMD 104 may send a message to the server 108 indicating that the first shared secret 158 has been generated. In some implementations, the computing device 106 may poll the server 108 for status of the association process. For example, at 516 the secure communication module 122 of the computing device 106 may poll the server 108 by sending a request for status that includes the request identifier previously provided by the server 108. The server 108 may respond to the request for status. For example, after receipt of the message sent at 514 and responsive to the request at 516, at 518 the server 108 sends a message indicative of success for the association process to this point.

At 520, the AMD 104 determines an image and outputs the image on the display 386 of a machine-readable encoding of the second public key 128. For example, the second public key 128 may be used as input to an application to determine a first image of a two-dimensional barcode that encodes the second public key 128. The second public key 128, as encoded within the two-dimensional barcode is not encrypted. For example, the encoding of the two-dimensional barcode may be openly available such that any observer viewing the barcode is able to determine the second public key 128.

In some implementations the AMD 104 may present a user interface requesting user confirmation before continuing with the association process. The AMD 104 may present, using an output device 218 of the AMD 104, a first user interface that includes a control to approve associating the AMD 104 with the computing device 106 or the first application executing on the computing device 106. For example, the display 386 may present the first identification data with another message, such as "Do you want to associate with "Pat's Phone"?". After receiving, from an input device of the AMD 104 such as a touch sensor, first input indicative of activation of the control approving the association, the association process may proceed. If the user 102 does not respond, or if the input is activation of a control denying the association, the association process terminates.

At 522, a camera of the computing device 106 is used to acquire a second image that includes at least a portion of the first image as displayed on the display 386 of the AMD 104. For example, the user 102 may use a camera on the computing device 106 to take a picture of the display 386 on the AMD 104 that is showing the first image of the two-dimensional barcode. In some implementations acquisition of the second image may be restricted to a camera that is physically incorporated into the computing device 106.

The second image is processed by the computing device 106 to determine the second public key 128. For example, an application may be used to recognize and decode the two-dimensional barcode in the second image and provide as output the second public key 128.

Other output devices may be used to transmit the second public key 128 to the computing device 106. For example, one or more lights 382 may be modulated to send the second public key 128. In another example, the projector 388 may be used to project the first image of the two-dimensional barcode. In other implementations, other techniques may be used to send the second public key 128 from the AMD 104 to the first computing device 106. For example, the second public key 128 may be represented as first audio data. The first audio data may be outputted using one or more of the transducers on the AMD 104. For example, a speaker 384 may be used to generate sound that encodes the second public key 128. In another example, a transducer on the ultrasonic sensor 318 may be used to generate ultrasonic sound that encodes the second public key 128. A corresponding transducer associated with the computing device 106, such as a microphone, may be used to detect the sound. The corresponding data acquired from the microphone may then be processed to determine the second public key 128.

At 524, the computing device 106 determines a second shared secret 132. For example, the secure communication module 122 may use the ECDH algorithm to determine the second shared secret 132 using the first public key 126 and the second public key 128.

At 526, the computing device 106 determines first encrypted data and sends a third message that includes the first encrypted data to the server 108. For example, the secure communication module 122 may use the second shared secret 132 to encrypt the first identification data. Encryption and decryption of data using the shared secret may be implemented as symmetric encryption. For example, symmetric encryption using the Advanced Encryption Standard (AES) in Galois/Counter Mode (GCM) (AES-GCM) algorithm may be used.

The third message sent to the server 108 comprises the first encrypted data and may also include unencrypted data. For example, the unencrypted data may include the second identification data, and the second data, such as the third identification data that identifies the AMD 104 to be associated.

At 528, the server 108 receives the third message and sends a fourth message to the AMD 104. The fourth message may comprise the first encrypted data and at least a portion of the first data, such as the second identification data. For example, the fourth message may omit the data indicative of the AMD 104 as the fourth message is being sent to the AMD 104.

At 530, the AMD 104 receives the fourth message and uses the first shared secret 158 to decrypt the first encrypted data. The now decrypted (cleartext) first identification data is available, along with the portion of the first data that was included, such as the second identification data. In some implementations, a comparison may be made to determine if the first identification data included in the fourth message matches the previously sent first identification data at 506. As a result of the successful decryption, and in some implementations the match of the first identification data, the first shared secret 158 and one or more of the first identification data or the second identification data are stored using the secure storage module 124.

At 532, the server 108 may send a message to the computing device 106. The message may include the request identifier and a pairing identifier that is indicative of the particular association attempt.

At 534, the AMD 104 uses one or more output devices 218 to present to the user 102 that the association is successful. For example, the AMD 104 may present on the display 386 text or an icon indicating that the association is successful.

At 536 the AMD 104 sends the server 108 a fifth message. The fifth message is indicative of the successful decryption of the first encrypted data and completion of the association.

At 538 the computing device 106 sends the server 108 a sixth message that includes the pairing identifier. The sixth message may comprise a request for status of the association. For example, the computing device 106 may poll the server 108 for an update.

At 540 the server 108, having received the sixth message, sends the computing device 106 a seventh message that is indicative of success of the association.

At 542, responsive to the seventh message, the computing device 106 stores the second shared secret 132 and one or more of the second data, such as the third identification data corresponding to the AMD 104.

At 544, the computing device 106 may present a user interface that provides information to the user 102 that the association is successful. For example, the computing device 106 may present on a display text or an icon indicating that the association is successful and a secure communication link is now available for use.

At this point, the AMD 104 has stored within the secure storage module 156 the first shared secret 158 and the computing device 106 has stored within the secure storage module 124 the second shared secret 132. The first shared secret 158 and the second shared secret 132 are identical, this having been confirmed by the successful encryption and decryption of data during the association process. The respective shared secrets have not been transmitted between the devices, and thus have not been subject to possible interception and compromise. As described below with regard to FIG. 7, the shared secret may be used to establish a cryptographically secure communication link between the AMD 104 and the computing device 106.

The process has been described with regard to the association process being initiated by the computing device 106. In other implementations the association process may be initiated by another device. For example, the AMD 104 may be used to initiate the association process.

In some implementations one or more of the operations described may be omitted. For example, the polling by the computing device 106 of the server 108 may be omitted. Continuing the example, the server 108 may push, or send messages without waiting for a request from the computing device 106.

In another implementation, the server 108 may be omitted. In this implementation, the messages may be exchanged between the AMD 104 and the computing device 106 without an intermediary. In this implementation, some operations may be unnecessary. For example, at 506 the first message may be sent from the first computing device 106 to the AMD 104. In another example, at 514 the message may be sent from the AMD 104 to the first computing device 106.

Figure 6:
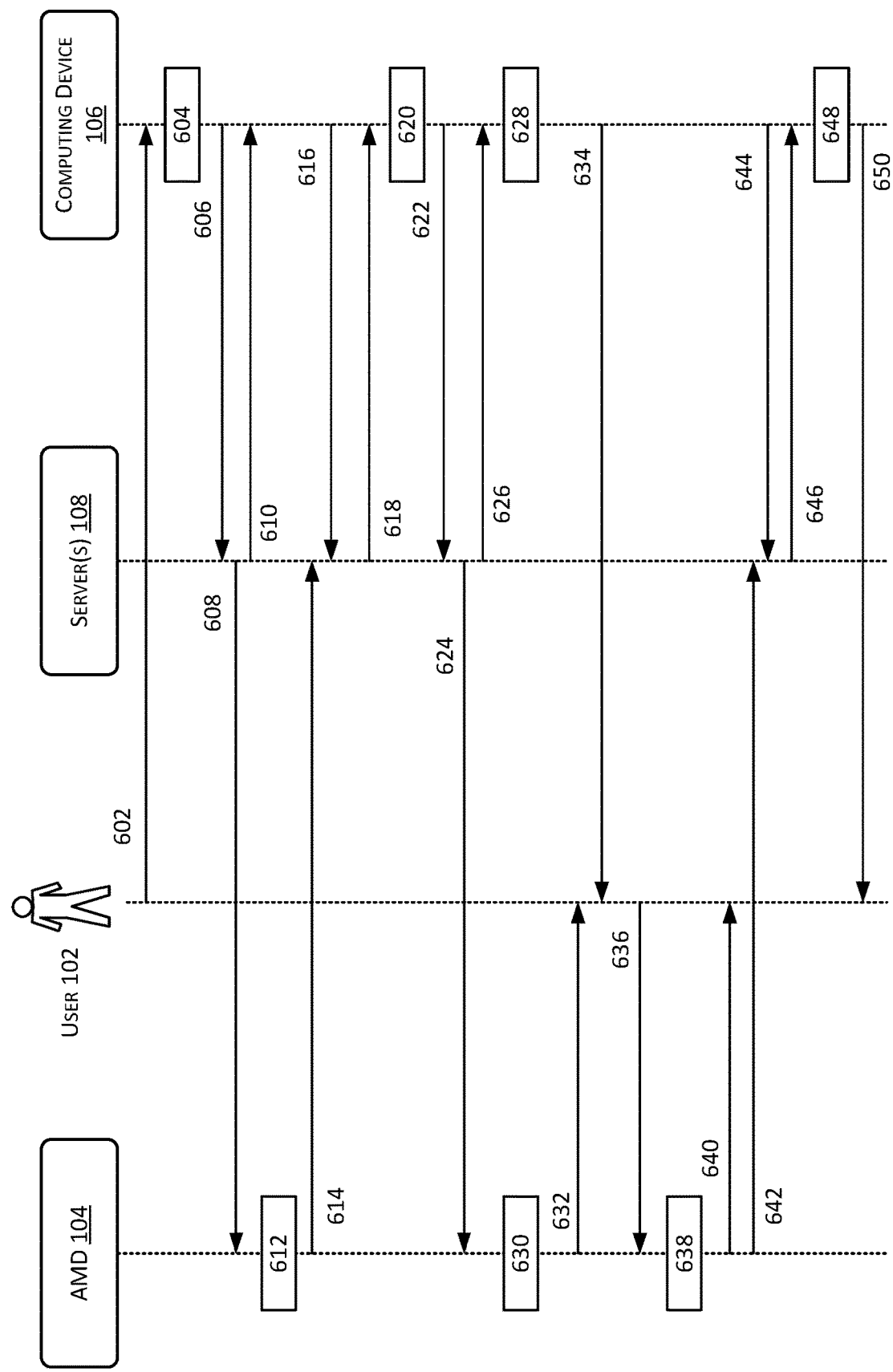
FIG. 6 illustrates a flow diagram of a process to associate the AMD with the application executing on the computing device using a one-time password presented by the computing device, according to some implementations.

FIG. 6 illustrates a flow diagram 600 of a process to associate the AMD 104 with the application executing on the computing device 106 using a one-time password presented by the computing device 106, according to some implementations.

In this illustration, the user 102, the AMD 104, the first computing device 106, and a second computing device such as the server 108 are shown. In this illustration time increases down the page. For example, an operation at the top of the diagram occurs before an operation at the bottom of the diagram. In some implementations, the order in which operations are performed may vary from that depicted. Operations performed by a device may be performed by one or more modules. These modules may include applications executing on one or more hardware processors of the respective device.

At 602, a user 102 provides input to the computing device 106 that initiates the process to associate the computing device 106, or an application executing thereon, with the AMD 104. For example, the user 102 may execute a first application on the computing device 106. The first application may authenticate the user 102 to a first user account. For example, the first application may accept a fingerprint or username and password to identify the user 102 and associated first user account. The first application may then present a user interface indicating that the AMD 104, also associated with the first user account, is available to be associated with.

At 604, the computing device 106 generates a first public key 126. For example, the secure communication module 122 may use an Elliptic Curve Diffie-Hellman (ECDH) algorithm to generate the first public key 126 responsive to the initiating of the association process.

At 606, the first computing device 106 sends, to a second computing device, a first message requesting establishment of secure communication between the computing device 106, or the application executing thereon, and a first AMD 104. For example, the secure communication module 122 may send a first message to the server 108. The first message may comprise the first public key 126, first data and second data. The first data may comprise first identification data indicative of the first application, and second identification data indicative of the first application. The first identification data may comprise a first value that is representative of the first application that is based at least in part on user input, and is unique with respect to a set of applications associated with a first user account. For example, the first value may comprise the string "Pat's Phone" as entered by the user 102. The second identification data may comprise a second value representative of the first application that is determined during installation or licensing of the first application and is unique with respect to at least the set of applications associated with the first user account. For example, the value may comprise an application identifier string generated during installation of the secure communication module 122 on the computing device 106.

The second data may comprise third identification data corresponding to the AMD 104. The third identification data may comprise a third value based at least in part on a device identifier that is unique with respect to at least a set of AMDs 104. For example, the third value may comprise a device serial number (DSN) that is provided to the AMD 104 during manufacture or setup.

The first message is received by the server 108, and at 608 the server 108 sends a second message to the AMD 104. The association module 110 executing on the server 108 may determine, based on the second data and previously stored information in the data store 112, a communication address associated with the AMD 104. For example, the association module 110 may query the data store 112 using the DSN to find a last known internet protocol address for that particular AMD 104. The second message may comprise the first public key 126 and at least a portion of the first data. For example, the portion of the second message may include the first identification data and the second identification data.

At 610, the server 108 sends a message to the computing device 106 that includes a request identifier. The message is indicative that the association process has begun.

At 612 the AMD 104 generates the second public key 128. For example, the secure communication module 154 may use the ECDH algorithm to generate the second public key 128. In some implementations, the generation of the second public key 128 may be responsive to receiving the second message.

The AMD 104 may then proceed to determine the first shared secret 158. For example, the secure communication module 154 may use the ECDH algorithm to determine the first shared secret 158 using the first public key 126 and the second public key 128. As described above, in some implementations, the generation of the second public key 128 and the subsequent operations may be conditional upon the AMD 104 being in a state deemed suitable for the association to take place.

In some implementations the AMD 104 may present a user interface requesting user confirmation before continuing with the association process. The AMD 104 may present, using an output device 218 of the AMD 104, a first user interface that includes a control to approve associating the AMD 104 with the computing device 106 or the first application executing on the computing device 106. For example, the display 386 may present the first identification data such as "Do you want to associate with "Pat's Phone"?". After receiving, from an input device of the AMD 104 such as a touch sensor, first input indicative of activation of the control approving the association, the association process may proceed. If the user 102 does not respond, or if the input is activation of a control denying the association, the association process terminates.

At 614, the AMD 104 may send a message to the server 108 that includes the second public key 128. In some implementations, the computing device 106 may poll the server 108 during the association process. For example, at 616 the secure communication module 122 of the computing device 106 may poll the server 108 by sending a request that includes the request identifier previously provided by the server 108. The server 108 may respond to the request. For example, after receipt of the message sent at 614 that includes the second public key 128, and responsive to the request at 616, at 618 the server 108 sends a message to the computing device 106 that includes the second public key 128.

At 620, the computing device 106 determines a second shared secret 132. For example, the secure communication module 122 may use the ECDH algorithm to determine the second shared secret 132 using the first public key 126 and the second public key 128. The computing device 106 then determines a first one-time password (OTP) 160 using the second shared secret 132. For example, the OTP 160 may comprise a 6-digit string using a hashed message authentication code (HMAC) algorithm.

At 622, the computing device 106 sends a third message to the server 108. The third message may comprise the first data, and the third identification data.

The third message is received by the server 108 and at 624 the server 108 sends a fourth message to the AMD 104. The fourth message may comprise at least a portion of the first data. For example, the fourth message may comprise the first identification data and the second identification data.

At 626, the server 108 may send a message to the computing device 106. The message may include the request identifier and a pairing identifier that is indicative of the particular association attempt.

The fourth message is received by the AMD 104. Responsive to this message, at 630 the AMD 104 determines a second OTP 160 using the first shared secret 158. If the same algorithm is used and the first shared secret 158 and the second shared secret 132 are identical, the resulting first OTP 134 and the second OTP 160 will be identical.

At 632, the AMD 104 presents, using an output device of the AMD 104, a request for entry of the first OTP 134. For example, the display 386 may present a user interface requesting entry of the OTP.

At 634, the computing device 106 presents, using an output device of the computing device 106, the first OTP 134. For example, the display device of the computing device 106 may present a user interface that shows the 6-digit OTP.

At 636, the AMD 104 receives, using an input device of the AMD 104, the first OTP 134. For example, the user 102 may look at the display device of the computing device 106, see the 6-digits of the OTP, and enter those digits into the AMD 104.

At 638, the AMD 104 determines that the first OTP 134 as entered matches the second OTP 160 generated locally. Responsive to a successful match, the AMD 104 stores the first shared secret 158 and one or more of the second data, such as the first data indicative of the computing device 106 or the secure communication module 122. If the match fails, the user interface of the AMD 104 may provide an additional opportunity for the user 102 to re-enter the OTP. If the number of failed matches meets or exceeds a threshold value, the association process is terminated. For example, if three attempts are allowed, and three incorrect entries are made, the association process terminates.

At 640, the AMD 104 uses one or more output devices 218 to present to the user 102 that the association is successful. For example, the AMD 104 may present on the display 386 text or an icon indicating that the association is successful.

At 642 the AMD 104 sends the server 108 a fifth message. The fifth message is indicative of the successful match of the first OTP 134 and the second OTP 160 and completion of the association.

At 644 the computing device 106 sends the server 108 a sixth message that includes the pairing identifier. The sixth message may comprise a request for status of the association. For example, the computing device 106 may poll the server 108 for an update.

At 646 the server 108, having received the sixth message, sends the computing device 106 a seventh message that is indicative of success of the association.

At 648, responsive to the seventh message, the computing device 106 stores the second shared secret 132 and one or more of the second data, such as the third identification data indicative of the AMD 104.

At this point, the AMD 104 has stored within the secure storage module 156 the first shared secret 158 and the computing device 106 has stored within the secure storage module 124 the second shared secret 132. The first shared secret 158 and the second shared secret 132 are identical, this having been confirmed by the match between the first OTP 134 and the second OTP 160 during the association process. The respective shared secrets have not been transmitted between the devices, and thus have not been subject to possible interception and compromise. As described below with regard to FIG. 7, the shared secret may be used to establish a cryptographically secure communication link between the AMD 104 and the computing device 106.

At 650, the computing device 106 may present a user interface that provides information to the user 102 that the association is successful. For example, the computing device 106 may present on a display text or an icon indicating that the association is successful.

The process has been described with regard to the association process being initiated by the computing device 106. In other implementations the association process may be initiated by another device. For example, the AMD 104 may be used to initiate the association process.

In some implementations one or more of the operations described may be omitted. For example, the polling by the computing device 106 of the server 108 may be omitted. Continuing the example, the server 108 may push, or send messages without waiting for a request from the computing device 106.

In another implementation, the server 108 may be omitted. In this implementation, the messages may be exchanged between the AMD 104 and the computing device 106 without an intermediary. In this implementation, some operations may be unnecessary. For example, at 606 the first message may be sent from the first computing device 106 to the AMD 104. In another example, at 614 the message may be sent from the AMD 104 to the first computing device 106.

Figure 7:
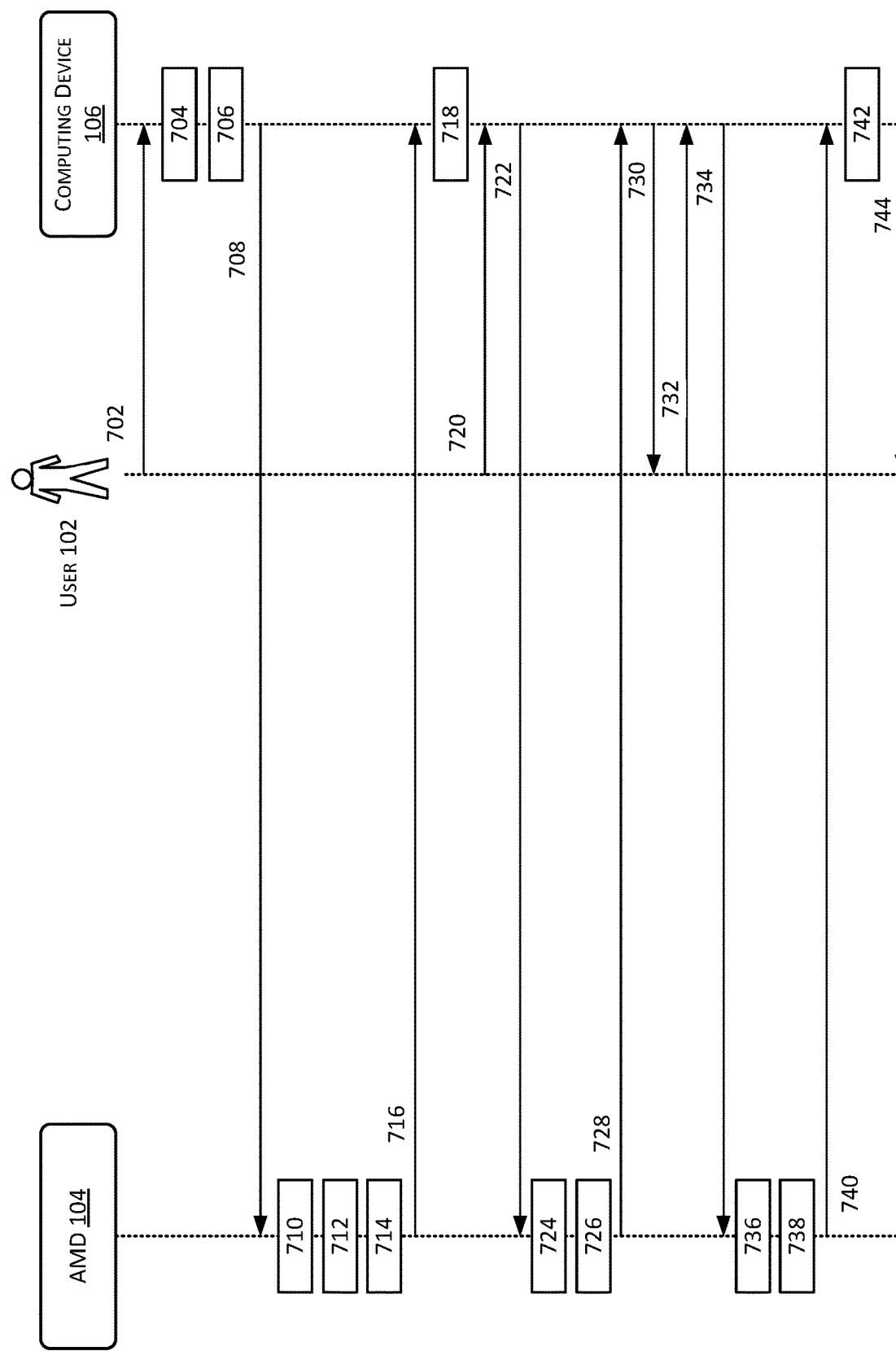
FIG. 7 illustrates a flow diagram of a process to communicate securely between the associated AMD and computing device, according to some implementations.

FIG. 7 illustrates a flow diagram 700 of a process to communicate securely between the associated AMD 104 and computing device 106, according to some implementations.

In this illustration, the user 102, the AMD 104, and the first computing device 106 are shown. The association process has previously completed, such as described above, and both devices have a shared secret that is identical. In this illustration time increases down the page. For example, an operation at the top of the diagram occurs before an operation at the bottom of the diagram. In some implementations, the order in which operations are performed may vary from that depicted. Operations performed by a device may be performed by one or more modules. These modules may include applications executing on one or more hardware processors of the respective device.

At 702 a request to establish a secure connection is made. For example, the user 102 may open a companion application executing on the computing device 106. The companion application may use a secure communication module 154. Continuing the example, if multiple AMDs 104 have been previously associated, the user 102 may be presented with a menu to select a particular AMD 104.

At 704 a first session key is determined by the computing device 106. For example, the first session key may comprise a cryptographic nonce that is randomly generated.

At 706, the shared secret associated with the particular AMD 104 is retrieved. For example, based on the selection of the particular AMD 104, the shared secret 158 previously associated with the third identification data corresponding to the particular AMD 104 may be retrieved from the secure storage module 156. The shared secret 158 is then used to encrypt the first session key, to create fourth encrypted data.

For example, symmetric encryption using the Advanced Encryption Standard (AES) in Galois/Counter Mode (GCM) (AES-GCM) algorithm may be used, with the shared secret 158 used as the cryptographic key to encipher the first session key for transmission.

In some implementations the fourth encrypted data may comprise other information, such as a connection command, a timestamp of the message, an expiration value, and so forth.

At 708, the computing device 106 sends, a tenth message that comprises the fourth encrypted data and at least a portion of the first data that is indicative of the computing device 106 or the application executing thereon. For example, the tenth message may include the second identification data. The tenth message may also include other information, such as a correlation token. The correlation token may comprise an unencrypted nonce value, that is deemed to be unique and provides a reference value for the participating devices to determine which connection a particular message is associated with. During the entirety of a session, the same correlation token is used.

At 710 the tenth message is received by the AMD 104.

At 712 the AMD 104 decrypts the fourth encrypted data to determine the first session key in cleartext. For example, by using the second identification data in the tenth message that is unencrypted, the secure communication module 154 may retrieve from the secure storage module 156 the corresponding shared secret 158. The shared secret 158 may then be used to decrypt the fourth encrypted data, revealing the first session key.

At 714, responsive to the successful decryption, the AMD 104 may save the first session key in the secure storage module 156 for use during the session.

At 716 the AMD 104 sends the computing device 106 an eleventh message that is indicative of success of the decryption of the first session key. The eleventh message may include the correlation token.

At 718, responsive to the eleventh message, the computing device 106 saves the first session key in the secure storage module 124 for use during the session.

With the first session key securely exchanged between the computing device 106 and the AMD 104, secure communications may proceed until disconnection, timeout, and so forth. The secure communications may include, but are not limited to, commands being sent to the AMD 104, sensor data 236 or other information being sent from the AMD 104, and so forth. For example, at 720 the user 102 may provide an input to the computing device 106. The input may be a command for the AMD 104 to move to a particular location in the physical space.

At 722, the computing device 106 generates command data. The secure communication module 122 uses the first session key to encrypt the command data and generate fifth encrypted data. A twelfth message is sent to the AMD 104 that includes the fifth encrypted data and may include other information such as the second identification data, the correlation token, and so forth.

At 724 the AMD 104 receives and decrypts the twelfth message using the first session key to determine the command data.

At 726 the AMD 104 may operate on the command data. For example, the AMD 104 may perform the requested move.

At 728 the AMD 104 may send a thirteenth message to the computing device 106. The thirteenth message may comprise data indicative of the result of the command data. For example, the thirteenth message may comprise an indication that the AMD 104 has reached the particular location specified by the command data.

At 730 the computing device 106 receives the thirteenth message and presents a user interface indicating that the operation was successful.

At 732, the computing device 106 may determine that the session is to be disconnected. For example, the user 102 may close the first application, activate a control in the user interface to disconnect, a timeout timer may expire, and so forth.

Responsive to the disconnection determination, at 734 the computing device 106 generates a session disconnect command. The secure communication module 122 uses the first session key to encrypt the session disconnect command and generate sixth encrypted data. A fourteenth message is sent to the AMD 104 that includes the sixth encrypted data and may include other information such as the second identification data, the correlation token, and so forth.

At 736 the AMD 104 receives and decrypts the fourteenth message using the first session key to determine the session disconnect command.

At 738 the AMD 104 may operate on the session disconnect command. For example, the AMD 104 may invalidate the first session key, erase the first session key from the secure storage module 156, and so forth.

At 740, the AMD 104 may send a fifteenth message to the computing device 106. The fifteenth message may comprise data confirming the disconnection.

At 742, the computing device 106 receives the fifteenth message. The computing device may invalidate the first session key, erase the first session key from the secure storage module 124, and so forth.

At 744, the computing device 106 presents a user interface indicating that the session has been disconnected.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

In some implementations the server 108 may be able to decrypt at least a portion of the information transferred between the AMD 104 and the computing device 106. For example, the processes described above may be used to associate the AMD 104 with a server 108 to determine a common shared secret that may subsequently be used for symmetric encryption.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
generating, by a first computing device using a first application, a first public key;
sending, by the first computing device to a second computing device, a first message comprising:
the first public key,
first identification data corresponding to the first application, and
device identification data corresponding to an autonomous mobile device (AMD);
sending, by the second computing device to the AMD, a second message comprising:
the first public key, and
the first identification data;
responsive to receiving the second message, determining by the AMD that the AMD is in a first state that allows a secure communication link to be established;
responsive to the first state, generating by the AMD a second public key;
determining, by the AMD, a first shared secret using the first public key and the second public key;
generating, by the AMD, a machine-readable image encoding the second public key;
receiving, by the first computing device, first data corresponding to the machine-readable image;
determining, by the first computing device, the second public key using the first data;
determining, by the first computing device, a second shared secret using the first public key and the second public key;
generating, by the first computing device using the second shared secret, first encrypted data comprising a first portion of the first identification data;
sending, by the first computing device to the AMD, a third message comprising the first encrypted data and a second portion of the first identification data;
decrypting, by the AMD using the first shared secret, the first encrypted data to determine the first identification data; and
establishing, by the AMD, a secure communication link between the AMD and the first computing device using the first identification data.

2. The method of claim 1, further comprising:
storing, in secure storage of the AMD:
the first identification data,
the device identification data, and
the first shared secret;
sending, by the AMD to the second computing device, a fourth message that is indicative of successful decryption of the first encrypted data;
sending, by the second computing device to the first computing device, a fifth message that is indicative of the successful decryption of the first encrypted data by the AMD; and
responsive to the fifth message, storing in secure storage of the first computing device:
the second shared secret, and
the device identification data.

3. The method of claim 1, wherein:
the first identification data comprises one or more of:
a first value based at least in part on user input that is representative of the first application, or
a second value representative of the first application that is determined during installation of the first application; and
the device identification data comprises a third value based at least in part on a device identifier of the AMD.

4. The method of claim 1, further comprising:
receiving, by the first computing device, a request to communicate with the AMD;
determining, by the first computing device, a first session key;
generating, by the first computing device using the second shared secret, second encrypted data comprising the first session key;
sending, by the first computing device to the AMD, a fourth message that comprises the second encrypted data and the device identification data;
decrypting, by the AMD using the first shared secret, the second encrypted data to determine the first session key;
generating, by the first computing device, a first command to operate the AMD;
generating, by the first computing device using the first session key, third encrypted data comprising the first command;
sending, by the first computing device to the AMD, the third encrypted data;
decrypting, by the AMD using the first session key, the third encrypted data to determine the first command; and
operating the AMD responsive to the first command.

5. The method of claim 1, further comprising:
outputting, by the AMD, a first user interface including a control to approve associating the AMD with the first application;

receiving, at the AMD, first input indicative of activation of the control; and wherein generating the machine-readable image by the AMD is responsive to receiving the first input.

6. The method of claim 1, further comprising:

responsive to the AMD determining the first shared secret, sending a fourth message by the AMD to the second computing device, wherein the fourth message is indicative of success in determining the first shared secret;

sending, by the second computing device to the first computing device, a fifth message that is indicative of the AMD successfully determining the first shared secret; and responsive to the fifth message, by the first computing device, operating a camera of the first computing device.

7. A computer-implemented method comprising:

generating, with a first application executing on a first computing device, a first public key;

sending, by the first application to a second computing device, a first message to establish secure communication between the first computing device and an autonomous mobile device (AMD), wherein the first message comprises:

the first public key, first identification data corresponding to the first application, and device identification data indicative of the AMD;

sending, by the second computing device to the AMD, a second message comprising:

the first public key, the first identification data, and the device identification data;

receiving, by the AMD, the second message;

responsive to the second message, determining by the AMD that the AMD is in a first state that allows a secure communication link to be established;

responsive to the first state, generating, by the AMD, a second public key;

determining, by the AMD, a first shared secret using the first public key and the second public key;

sending, by the AMD to the second computing device, the second public key;

sending, by the second computing device to the first computing device, the second public key;

determining, by the first computing device, a second shared secret using the first public key and the second public key;

generating, by the first computing device, a first one-time password (OTP) using the second shared secret;

sending, by the first computing device to the second computing device, a third message that comprises:

the first identification data, and the device identification data;

sending, by the second computing device to the AMD, a fourth message comprising the first identification data;

generating, by the AMD, a second OTP using the first shared secret;

outputting, by the first computing device, the first OTP;

receiving, at the AMD, first input indicative of the first OTP;

determining, by the AMD, that the first input matches the second OTP; and establishing, by the AMD, a secure communication link between the AMD and the first computing device.

8. The method of claim 7, further comprising:

storing, in secure storage of the AMD:

the first identification data, the device identification data, and the first shared secret;

sending, by the AMD to the second computing device, a fifth message that is indicative of success of the establishment of the secure communication link;

sending, by the second computing device to the first computing device, a sixth message that is indicative of the success; and storing, in secure storage of the first computing device:

the second shared secret, and the device identification data.

9. The method of claim 7, wherein:

the first identification data comprises one or more of:

a first value that is based at least in part on user input and is unique with respect to a set of applications associated with a first user account, or a second value that is representative of the first application, further wherein the second value is determined during installation of the first application and is unique with respect to at least the set of applications associated with the first user account; and the device identification data comprises a third value based at least in part on a device identifier of the AMD that is unique with respect to at least a set of AMDs.

10. The method of claim 7, further comprising:

receiving, by the first computing device, a request to communicate with the AMD;

determining, by the first computing device, a first session key;

generating, by the first computing device using the second shared secret, first encrypted data comprising the first session key;

sending, by the first computing device to the AMD, a fifth message that comprises the first encrypted data and the device identification data;

decrypting, by the AMD using the first shared secret, the first encrypted data to determine the first session key;

sending, by the first computing device to the AMD, a sixth message that is indicative of success of the decryption;

determining, by the first computing device, a first command to operate the AMD;

generating, by the first computing device using the first session key, second encrypted data comprising the first command;

sending, by the first computing device to the AMD, the second encrypted data;

decrypting, by the AMD using the first session key, the second encrypted data to determine the first command; and operating the AMD responsive to the first command.

11. A computer-implemented method comprising:

generating, by a first computing device using a first application, a first public key;

sending, by the first computing device to a second computing device, a first message comprising:

the first public key, first data corresponding to the first application, and device identification data corresponding to an autonomous mobile device (AMD);

sending, by the second computing device to the AMD, a second message comprising:

the first public key, and
the first data;
receiving, by the AMD, the second message;
responsive to the second message, determining by the AMD that the AMD is in a first state that allows a secure communication link to be established;
responsive to the first state, generating, by the AMD, a second public key;
determining, by the AMD, a first shared secret using the first public key and the second public key; and
establishing, by the AMD, a secure communication link between the first computing device and the AMD.

12. The method of claim 11, further comprising:
determining, by the first computing device, a request to communicate with the AMD;
determining, by the first computing device, a first session key;
generating, by the first computing device and using a second shared secret, first encrypted data comprising the first session key;
sending, by the first computing device to the AMD, a third message that comprises the first encrypted data and at least a portion of the first data;
decrypting, by the AMD using the second shared secret, the first encrypted data to determine the first session key;
generating, by the first computing device using the first session key, second encrypted data comprising information to be sent to the AMD;
sending, by the first computing device to the AMD, the second encrypted data; and
decrypting, by the AMD using the first session key, the second encrypted data to determine the information.

13. The method of claim 11, wherein:
the first data comprises one or more of:
a first value that is representative of the first application, wherein the first value is:
based at least in part on user input, and
is unique with respect to a set of applications associated with a first user account, or
a second value that is representative of the first application, further wherein the second value is:
determined during installation or licensing of the first application, and
is unique with respect to at least the set of applications associated with the first user account; and
the device identification data comprises a third value based at least in part on a device identifier that is unique with respect to at least a set of AMDs.

14. The method of claim 11, the establishing the secure communication link between the first computing device and the AMD comprising:
generating, by the AMD, a machine-readable image encoding the second public key;
receiving, by the first computing device, second data corresponding to the machine-readable image;
determining, by the first computing device, the second public key using the second data;
determining, by the first computing device, a second shared secret using the first public key and the second public key;
generating, by the first computing device using the second shared secret, first encrypted data comprising the first data;
sending, by the first computing device to the second computing device, a third message that comprises the first encrypted data, at least a portion of the first data, and the device identification data;
sending, by the second computing device to the AMD, a fourth message comprising the first encrypted data and the at least a portion of the first data;
decrypting, by the AMD using the first shared secret, the first encrypted data to determine the at least a portion of the first data;
sending, by the AMD to the second computing device, a fifth message that is indicative of successful decryption of the first encrypted data; and
sending, by the second computing device to the first computing device, a sixth message that is indicative of the successful decryption of the first encrypted data by the AMD.

15. The method of claim 14, further comprising:
outputting, by the AMD, a first user interface including a control to approve associating the AMD with the first computing device;
receiving, at the AMD, first input indicative of activation of the control; and
wherein the determining the second public key using the second data is responsive to the first input.

16. The method of claim 14, further comprising:
responsive to the AMD determining the first shared secret, sending by the AMD to the second computing device a seventh message, wherein the seventh message is indicative of success in determining the first shared secret;
sending, by the second computing device to the first computing device, an eighth message that is indicative of the AMD successfully determining the first shared secret; and
responsive to the eighth message, by the first computing device, operating a camera of the first computing device.

17. The method of claim 11, the establishing the secure communication link between the first computing device and the AMD comprising:
determining, by the AMD, first audio data comprising a machine-readable encoding of the second public key;
outputting, using a first transducer of the AMD, the first audio data;
acquiring, with a second transducer of the first computing device, second audio data that includes at least a portion of the first audio data as outputted by the first transducer;
determining, by the first computing device, the second public key using the second audio data;
determining, by the first computing device, a second shared secret using the first public key and the second public key;
generating, by the first computing device using the second shared secret, first encrypted data comprising the first data;
sending, by the first computing device to the second computing device, a third message that comprises the first encrypted data, at least a portion of the first data, and the device identification data;
sending, by the second computing device to the AMD, a fourth message comprising the first encrypted data and the at least a portion of the first data;
decrypting, by the AMD using the first shared secret, the first encrypted data to determine the at least a portion of the first data;

sending, by the AMD to the second computing device, a fifth message that is indicative of successful decryption of the first encrypted data; and sending, by the second computing device to the first computing device, a sixth message that is indicative of the successful decryption of the first encrypted data by the AMD.

18. The method of claim 11, further comprising:

sending, by the AMD to the second computing device, the second public key;

sending, by the second computing device to the first computing device, the second public key; and the establishing the secure communication link between the first computing device and the AMD comprising:

determining, by the first computing device, a first one-time password (OTP) using a second shared secret;

sending, by the first computing device to the second computing device, a third message that comprises:
the first data, and
the device identification data;

sending, from the second computing device to the AMD, a fourth message comprising:
at least a portion of the first data, and
determining, by the AMD, a second OTP using the first shared secret;

outputting, at the first computing device, the first OTP;

receiving, at the AMD, input data indicative of the first OTP; and determining, by the AMD, that the input data matches the second OTP.

19. The method of claim 11, further comprising:
storing, in secure storage of the AMD:
at least a portion of the first data,
the device identification data, and
the first shared secret; and
storing in secure storage of the first computing device:
a second shared secret, and
the device identification data.

20. The method of claim 12, further comprising:
operating the AMD based on the information decrypted from the second encrypted data.

* * * * *